United States Patent
Chono et al.

(10) Patent No.: US 11,978,282 B2
(45) Date of Patent: *May 7, 2024

(54) AUTHENTICATION SYSTEM, AUTHENTICATION METHOD, AND STORAGE MEDIUM

(71) Applicant: NEC Corporation, Tokyo (JP)

(72) Inventors: Keiichi Chono, Tokyo (JP); Masato Tsukada, Tokyo (JP); Chisato Funayama, Tokyo (JP); Ryuichi Akashi, Tokyo (JP); Yuka Ogino, Tokyo (JP); Takashi Shibata, Tokyo (JP); Shoji Yachida, Tokyo (JP); Hiroshi Imai, Tokyo (JP); Emi Kitagawa, Tokyo (JP); Yasuhiko Yoshida, Tokyo (JP); Yusuke Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,004

(22) Filed: Oct. 17, 2022

(65) Prior Publication Data
US 2023/0040456 A1    Feb. 9, 2023

Related U.S. Application Data

(63) Continuation of application No. 17/280,226, filed as application No. PCT/JP2018/036039 on Sep. 27, 2018, now Pat. No. 11,501,570.

(51) Int. Cl.
*G06V 40/18*  (2022.01)
*G06V 10/147*  (2022.01)
(Continued)

(52) U.S. Cl.
CPC ............ *G06V 40/19* (2022.01); *G06V 10/147* (2022.01); *G06V 10/255* (2022.01); *G06V 40/197* (2022.01); *G06V 10/62* (2022.01)

(58) Field of Classification Search
CPC .... G06V 40/19; G06V 40/197; G06V 10/147; G06V 10/255; G06V 10/62; G06V 20/20; G06V 20/52; H04N 7/181
See application file for complete search history.

(56) References Cited

U.S. PATENT DOCUMENTS 8,908,218 B2 * 12/2014 Ito ..................... G06K 15/00
                                                          358/1.9
10,282,720 B1    5/2019 Buibas ................. G07F 19/207
(Continued)

FOREIGN PATENT DOCUMENTS

CN    104346603 A    2/2015    ......... G06K 9/00255
EP    2442286 A1    4/2012    ......... G06K 9/00771
(Continued)

OTHER PUBLICATIONS

Extended European Search Report for EP Application No. 18934856.8 dated Aug. 19, 2021.
(Continued)

*Primary Examiner* — Carol Wang

(57) ABSTRACT

An authentication system according to one aspect of the present disclosure includes: at least one memory storing a set of instructions; and at least one processor configured to execute the set of instructions to: track an object included in a video captured by a first capture device; detect a candidate for biometric authentication in the object being tracked; determine whether biometric authentication has been performed for the candidate based on a record of biometric authentication performed for the object being tracked; and perform the biometric authentication for the candidate based on a video of an authentication part of the candidate when
(Continued)

the biometric authentication has not been performed for the candidate, the video of the authentication part being captured by a second capture device having a capture range including a part of a capture range of the first capture device.

9 Claims, 10 Drawing Sheets

(51) Int. Cl.
　　　*G06V 10/20*　　(2022.01)
　　　*G06V 40/19*　　(2022.01)
　　　*G06V 10/62*　　(2022.01)

(56) References Cited

U.S. PATENT DOCUMENTS

| | | | |
|---|---|---|---|
| 10,460,164 B2* | 10/2019 | Kimura | G06V 40/197 |
| 2013/0121541 A1* | 5/2013 | Hwang | H04L 63/0861 382/118 |
| 2018/0239953 A1 | 8/2018 | Miwa | |

FOREIGN PATENT DOCUMENTS

| | | |
|---|---|---|
| JP | 2004185484 A | 7/2004 |
| JP | 2007-303239 A | 11/2007 |
| JP | 2008-040781 A | 2/2008 |
| JP | 2014-219704 A | 11/2014 |
| JP | 2016-046639 A | 4/2016 |
| JP | 7151775 B2 | 10/2022 |
| WO | 2009/036103 A1 | 3/2009 |

OTHER PUBLICATIONS

International Search Report for PCT Application No. PCT/JP2018/036039, dated Dec. 4, 2018.
English translation of Written opinion for PCT Application No. PCT/JP2018/036039, dated Dec. 4, 2018.
Translated Version of JP2007303239 (Year: 2007).
JP Office Action for JP Application No. 2022-155783, dated Jul. 11, 2023 with English Translation.

* cited by examiner

AUTHENTICATION SYSTEM, AUTHENTICATION METHOD, AND STORAGE MEDIUM

CROSS-REFERENCE TO RELATED APPLICATIONS

The present application is a continuation application of U.S. patent application Ser. No. 17/280,226 filed on Mar. 26, 2021, which is a National Stage Entry of international application No. PCT/JP2018/036039 filed on Sep. 27, 2018, the disclosures of all of which are incorporated in their entirety by reference herein.

TECHNICAL FIELD

The example embodiments relates to an authentication technology, and particularly to an iris authentication technology.

BACKGROUND ART

PTL 1 discloses an authentication device for determining an abnormal state when a predetermined time has elapsed since an unauthenticated intruder entered a restricted area of a monitoring space.

CITATION LIST

Patent Literature

[PTL 1] JP 2016-046639 A

SUMMARY

Technical Problem

Among biometric authentication, iris authentication requires a relatively large number of arithmetic operations. As the number of times of the iris authentication increases, a necessary arithmetic amount also increases and a load on a system that performs the iris authentication also increases. The technique disclosed in PTL 1 cannot suppress the increase in the arithmetic amount for iris authentication in a case where a person is repeatedly authenticated by the iris authentication.

One of objects of the example embodiments is to provide an authentication system capable of suppressing an increase in an arithmetic amount for biometric authentication in a case where an object is repeatedly biometrically authenticated.

Solution to Problem

An authentication system according to an aspect of the example embodiments includes: tracking means for tracking an object included in a video captured by a first capture device; detection means for detecting a candidate for biometric authentication in the object being tracked; determination means for determining whether biometric authentication has been performed for the candidate based on a record of biometric authentication performed for the object being tracked; and authentication means for performing the biometric authentication for the candidate based on a video of an authentication part of the candidate when the biometric authentication has not been performed for the candidate, the video of the authentication part being captured by a second capture device having a capture range including a part of a capture range of the first capture device.

An authentication system according to an aspect of the example embodiments includes: tracking means for tracking an object included in a video captured by a first capture device; authentication means for performing, based on a video of an authentication part of the candidate, biometric authentication for a candidate in the object being tracked, the video being captured by a second capture device having a capture range including a part of a capture range of the first capture device; generation means for generating, based on a record of the biometric authentication performed for the object being tracked, an output image on which a mark is superimposed, the output image representing the capture range of the first capture device, the mark indicating the object being tracked and whether biometric authentication has been performed for the object being tracked; and output means for outputting the generated output image.

An authentication method according to an aspect of the example embodiments includes: tracking an object included in a video captured by a first capture device; detecting a candidate for biometric authentication in the object being tracked; determining whether biometric authentication has been performed for the candidate based on a record of biometric authentication performed for the object being tracked; and performing the biometric authentication for the candidate based on a video of an authentication part of the candidate when the biometric authentication has not been performed for the candidate, the video of the authentication part being captured by a second capture device having a capture range in a part of a capture range of the first capture device.

An authentication method according to an aspect of the example embodiments includes: tracking an object included in a video captured by a first capture device; performing, based on a video of an authentication part of the candidate, biometric authentication for a candidate for biometric authentication in the object being tracked, the video being captured by a second capture device having a capture range including a part of a capture range of the first capture device; generating, based on a record of the biometric authentication performed for the object being tracked, an output image on which a mark is superimposed, the output image representing the capture range of the first capture device, the mark indicating the object being tracked and whether biometric authentication has been performed for the object being tracked; and outputting the generated output image.

A storage medium according to an aspect of the example embodiments stores a program causing a computer to execute: tracking processing of tracking an object included in a video captured by a first capture device, detection processing of detecting a candidate for biometric authentication in the object being tracked; determination processing of determining whether biometric authentication has been performed for the candidate based on a record of biometric authentication performed for the object being tracked; and authentication processing of performing the biometric authentication for the candidate based on a video of an authentication part of the candidate when the biometric authentication has not been performed for the candidate, the video of the authentication part being captured by a second capture device having a capture range in a part of a capture range of the first capture device.

A storage medium according to an aspect of the example embodiments stores a program causing a computer to execute: tracking processing of tracking an object included in a video captured by a first capture device; authentication processing of performing, based on a video of an authentication part of the candidate, biometric authentication for a candidate for biometric authentication in the object being tracked, the video being captured by a second capture device having a capture range including a part of a capture range of the first capture device; generation processing of generating, based on a record of the biometric authentication performed for the object being tracked, an output image on which a mark is superimposed, the output image representing the capture range of the first capture device, the mark indicating the object being tracked and whether biometric authentication has been performed for the object being tracked; and output processing of outputting the generated output image.

An aspect of the example embodiments is implemented also by each of programs stored in the above-described storage medium.

Advantageous Effects

The example embodiments has an effect of suppressing an increase in an arithmetic amount for authentication in a case where an object is repeatedly authenticated.

EXAMPLE EMBODIMENTS

Next, example embodiments will be described in detail with reference to the drawings.

First Example Embodiment

Hereinafter, a first example embodiment will be described in detail with reference to the drawings.

Configuration

Figure 1:
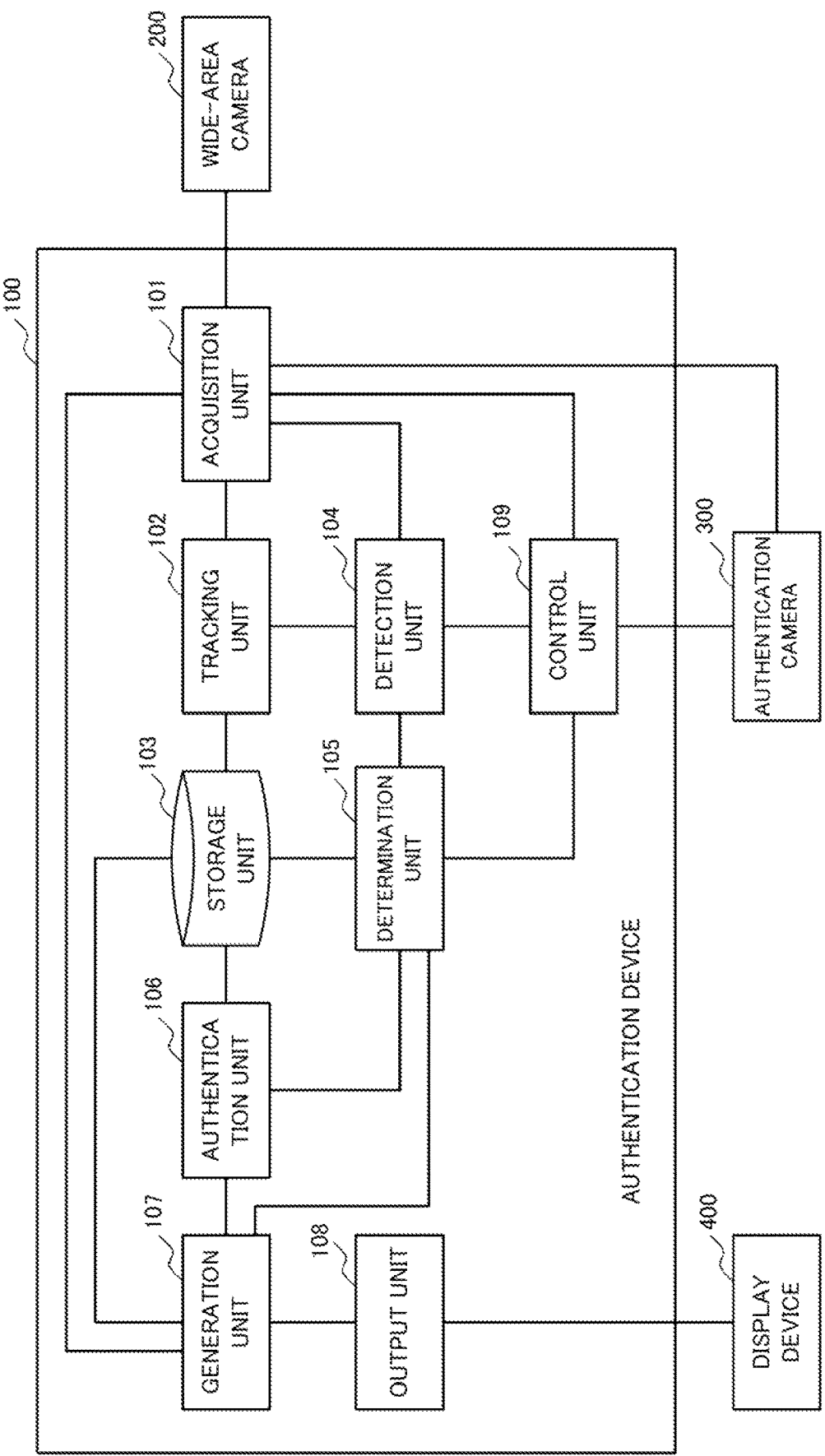
FIG. 1 is a block diagram illustrating a configuration of an authentication system according to a first example embodiment.

First, a configuration of an authentication system according to the first example embodiment will be described. FIG. 1 is a block diagram illustrating a configuration of an authentication system according to a first example embodiment.

Authentication System 10

In the example illustrated in FIG. 1, an authentication system 10 includes an authentication device 100, a wide-area camera 200, an authentication camera 300, and a display device 400.

Figure 2:
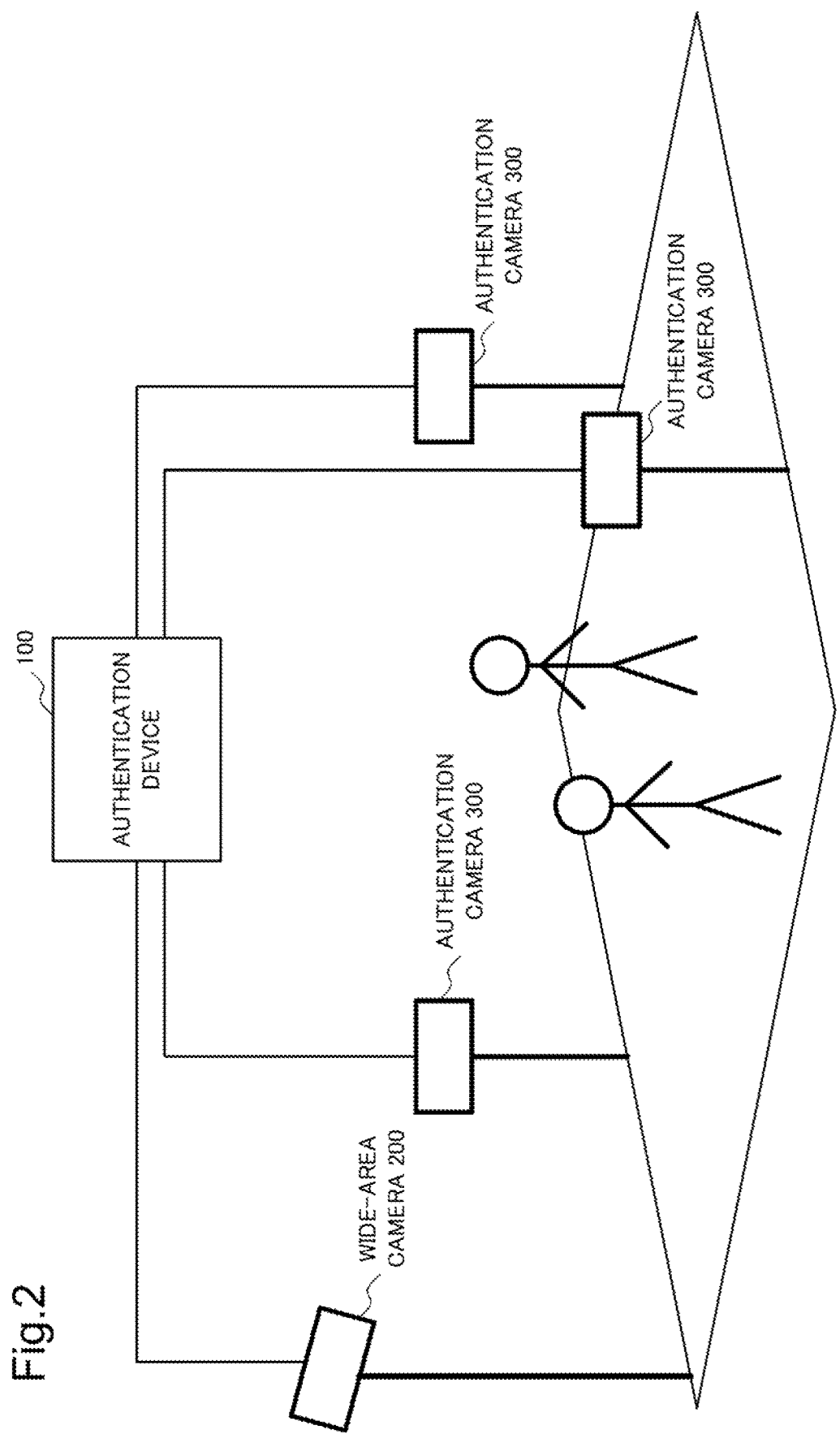
FIG. 2 is a diagram schematically illustrating an environment in which a capture device according to the first example embodiment is installed.

FIG. 2 is a diagram schematically illustrating an environment in which capture devices of the example embodiment, namely, the wide-area camera 200 and a plurality of the authentication cameras 300 of the authentication system 10 are installed. In the example illustrated in FIG. 2, one wide-area camera 200 and three authentication cameras 300 are installed. The one wide-area camera 200 and the three authentication cameras 300 are connected to the authentication device 100. The location of the authentication device 100 is not limited.

Authentication Device 100

The authentication device 100 includes an acquisition unit 101, a tracking unit 102, a storage unit 103, a detection unit 104, a determination unit 105, an authentication unit 106, a generation unit 107, an output unit 108, and a control unit 109. The authentication device 100 is communicatively connected to the wide-area camera 200, the authentication camera 300, and the display device 400.

Camera

The wide-area camera 200 and the authentication camera 300 may be installed in a space such as a room, for example. The wide-area camera 200 is also referred to as a first capture device. The authentication camera 300 is also referred to as a second capture device.

The authentication camera 300 is a camera that captures an object for iris authentication. The authentication camera 300 captures an image of the object for iris authentication and transmits the image to the authentication device 100. The image captured and output by the authentication camera 300 may be a still image. The image captured and output by the authentication camera may be a moving image (that is, a video). The authentication camera 300 may be installed at a height at which the authentication camera 300 can capture a face of a walking person, for example. A focal length of the authentication camera 300 may be adjusted, in advance, so that the authentication camera 300 can capture an iris of a person in the environment where the authentication camera 300 is installed. The authentication camera 300 may have a zooming function. The authentication camera 300 may be configured to, for example, capture a person with a focal length on a wide-angle side, detect the position of the iris of the captured person, change a capture direction so that the position of the iris comes at the center of the image, zoom, and capture the iris of the person. The plurality of authentication cameras may be installed at different locations, for example. The plurality of authentication cameras 300 is communicatively connected to the authentication device 100. Hereinafter, a case in which one authentication camera 300 is installed and connected to the authentication device 100 will be described. In a case where a plurality of authentication cameras 300 is installed and connected to the authentication device 100, the authentication device 100 may separately perform processing of the plurality of authentication cameras 300, the processing being equivalent to processing regarding one authentication camera 300.

The authentication camera 300 may be configured to capture the iris of the person in a capturable range according to an instruction from the authentication device 100, for example. When receiving the instruction to capture the iris, the authentication camera 300 autonomously captures the person with the focal length on the wide-angle side, detects the position of the iris of the captured person, change the capture direction so that the position of the iris comes at the center of the image, zooms, and captures the iris of the person. The authentication camera 300 may be configured to operate according to a received instruction when receiving an instruction to change the direction, an instruction to zoom, an instruction to capture an image, or the like. In this case, the authentication device 100 may calculate a value indicating the change of the direction of the camera, a value indicating the amount of zoom, or the like on the basis of a video captured by the authentication camera 300, and transmit the instruction to change the direction, the instruction to zoom, the instruction to capture an image, or the like to the authentication camera 300.

The wide-area camera 200 is a camera installed to capture a range including a range captured by the authentication camera 300. The wide-area camera 200 may be installed to capture the entire space where the wide-area camera 200 and the authentication camera 300 are installed. A focal length of the wide-area camera 200 may be set to capture the entire space where the wide-area camera 200 and the authentication camera 300 are installed from the place where the wide-area camera 200 is installed. The wide-area camera 200 transmits a video obtained by capture to the acquisition unit 101 of the authentication device 100, for example.

The positional relationship of the wide-area camera 200 with the authentication camera 300 may be measured in advance and known. For example, in the video captured by the wide-area camera 200, a region corresponding to the range of the position of the person in which the authentication camera 300 can capture the iris may be specified in advance. In other words, in the video captured by the wide-area camera 200, where the person is located so that the authentication camera 300 can capture the iris of the person may be specified in advance. For example, the detection unit 104 to be described below may specify the region corresponding to the range of the position of the person in which the authentication camera 300 can capture the iris in the video captured by the wide-area camera 200, on the basis of parameters such as the positions, directions, and focal lengths of the wide-area camera 200 and the authentication camera 300.

Display Device 400

The display device 400 is a device having a function to display a received image or the like, such as a display or a terminal device. In a case where the display device 400 is a portable terminal device, the wide-area camera 200 may be a camera mounted on the portable terminal device.

Acquisition Unit 101

The acquisition unit 101 receives the video captured by the wide-area camera 200 from the wide-area camera 200. The acquisition unit 101 further receives the image captured by the authentication camera 300 from the authentication camera 300. The acquisition unit 101 transmits the video received from the wide-area camera 200 to the tracking unit 102 and the detection unit 104. The acquisition unit 101 may send the video received from the wide-area camera 200 to the generation unit 107. The acquisition unit 101 may send the image received from the authentication camera 300 to the authentication unit 106. The acquisition unit 101 may further send the image received from the authentication camera 300 to the detection unit 104.

Tracking Unit 102

The tracking unit 102 extracts a person from the video (hereinafter referred to as a wide-area video) received from the acquisition unit 101, and tracks the extracted person. In other words, the tracking unit 102 extracts a region of the person in each of a plurality of frames of the video, specifies the corresponding regions of the person between adjacent frames, and tracks transition of the region of the same person in the video. The tracking unit 102 may track the person in the wide-area video using any of various existing methods for tracking a person.

The tracking unit 102 may assign an identifier (hereinafter also referred to as a tracking identifier) to the person being tracked. Then, the tracking unit 102 may associate the position of the region where the person is extracted in a frame of the video, a frame number, and the identifier of the person with one another. The tracking unit 102 may store information of the person being tracked (hereinafter also referred to as tracking information), more specifically, the position of the region where the person is extracted, the frame number, and the identifier of the person associated with one another in the storage unit 103. The tracking identifier is assigned to distinguish the person being tracked. In a case where a person who is not the person being tracked is newly detected in the video captured by the wide-area camera 200, that is, the above-described wide-area video, the tracking unit 102 may assign, for example, a tracking identifier not included in the tracking information stored in the storage unit 103, which is described below, to the detected person.

When a predetermined time has elapsed since the last detection, the tracking unit 102 may delete the tracking information of the detected person from the storage unit 103.

The tracking unit 102 sends the information of the person being tracked, that is, the tracking information to the detection unit 104.

Storage Unit 103

The storage unit 103 stores the tracking information, that is, the position of the region where the person is extracted and the identifier of the extracted person for each frame. Specifically, the storage unit 103 may store the position of the region where the person is extracted, the frame number, and the identifier of the person (that is, the tracking identifier) associated with one another by the tracking unit 102 as the tracking information.

The storage unit 103 further stores information of iris authentication performed for the person being tracked by the authentication unit 106 (hereinafter the information is also referred to as authentication record information). The authentication record information may include, for example, the tracking identifier of the person being tracked, and information indicating a result of the iris authentication that is associated with the tracking identifier and has been performed for the person identified by the tracking identifier. The information indicating a result of iris authentication may be, for example, either information indicating that the iris authentication has been performed but the person cannot be specified or information indicating that the iris authentication has been performed and the person is specified. In the case where the information indicating a result of iris authentication is the information indicating that the iris authentication has been performed and the person is specified, the tracking identifier may be associated with information indicating the registered person who has been specified by the iris authentication. The information indicating the registered person may be, for example, an identifier of the registered person (hereinafter referred to as registration identifier). The information indicating a result of iris authentication may be the registration identifier. The authentication record information may include, for example, date and time when the iris authentication is performed. The authentication record information is stored by the authentication unit 106 to be described below.

In the example embodiment, in a case where the tracking identifier is not included in the authentication record information, the authentication record information indicates that the iris authentication for the person identified by the tracking identifier has not been performed.

The storage unit 103 stores information (hereinafter also referred to as registration information) including the registration identifier of the person, and information to be used for iris authentication (for example, a characteristic amount extracted from an image of the iris of the person) associated with each other. The registration information is stored in the storage unit 103 in advance by, for example, an operation of an operator of the authentication system 10 or the like. As for the registered person, the registration information referring to the person for which the registration identifier and the information to be used for iris authentication are stored, in advance, in the storage unit 103 may include information of the person (for example, profile information such as a name, a belonging group, and a position) and other information.

Detection Unit 104

The detection unit 104 receives the video captured by the wide-area camera 200 from the acquisition unit 101. The detection unit 104 may receive the video captured by the authentication camera 300 from the acquisition unit 101. The acquisition unit 101 receives information of the person being tracked from the tracking unit 102. The information of the person being tracked is, for example, information of the position of the person being tracked in the video captured by the wide-area camera 200 (for example, coordinates specifying the region of the person being tracked, or the like) and the identifier of the person (that is, the above-described tracking identifier).

The detection unit 104 detects a candidate person, who is a person in a range where the authentication camera 300 can capture the iris, among the persons being tracked. Specifically, the detection unit 104 may estimate the position of a person in a space where the person exists, on the basis of the position of the person being tracked in the video captured by the wide-area camera 200. In a case where the distance between the estimated position of the person in the space and the position at which the authentication camera 300 is installed is equal to or less than a predetermined distance, the detection unit 104 may determine that the person at the estimated position is the person in the range where the authentication camera 300 can capture the iris (that is, the candidate person).

The detection unit 104 may detect a person in the video of the authentication camera 300 and determine whether the detected person is in the range where the authentication camera 300 can capture the iris. For example, the detection unit 104 may calculate the size of the face of the detected person in the video captured by the authentication camera 300 and determine, on the basis of the size of the face, whether the detected person is in the range where the authentication camera 300 can capture the iris. Specifically, in a case where the size of the face of the person is larger than a predetermined face size according to the focal length of the authentication camera 300, the detection unit 104 may determine that the detected person is in the range where the authentication camera 300 can capture the iris. For example, the detection unit 104 may calculate the size of a pupil of the detected person in the video captured by the authentication camera 300 and determine, on the basis of the calculated size of the pupil, whether the detected person is in the range where the authentication camera 300 can capture the iris. Specifically, in a case where the size of the pupil of the person is larger than a predetermined pupil size according to the focal length of the authentication camera 300, the detection unit 104 may determine that the detected person is in the range where the authentication camera 300 can capture the iris. In these cases, the detection unit 104 obtains, in advance, information of the focal length of the authentication camera 300 of when capturing the video via the acquisition unit 101. The information of the focal length of the authentication camera 300 may be included in data of the video sent from the authentication camera 300, for example.

In the case where it is determined that the person detected in the video of the authentication camera 300 is in the range where the authentication camera 300 can capture the iris, the detection unit 104 specifies the person being tracked in the video of the wide-area camera 200, the person corresponding to the person detected in the video of the authentication camera 300. The detection unit 104 may specify the person being tracked corresponding to the person detected in the video of the authentication camera 300 on the basis of personal characteristics, such as clothes of the person, the shape of the person, the position of the person, and the direction of the person.

Specifically, the detection unit 104 may detect the personal characteristics of the person in the video of the authentication camera 300 and the person being tracked in the video of the wide-area camera 200. In a case where the matching personal characteristics that have been detected satisfies predetermined criteria, the detection unit 104 may determine that the person in the video of the authentication camera 300 corresponds to the person being tracked. In a case where, for example, a ratio of matching characteristics to the detected characteristics of the persons in both of the videos is larger than a predetermined value, the detection unit 104 may determine that the matching personal characteristics satisfy the predetermined criteria. Each of the personal characteristics may be given a weight. The detection unit 104 may calculate a sum of the weights of the matching characteristics as a score, and determine that the matching personal characteristics satisfy the predetermined criterion in a case where the calculated score exceeds a predetermined value, for example.

The clothes of the person may be a color or a type of clothing, for example. The clothes of the person may include presence or absence, type, shape, color, and the like of accessories such as glasses, a hat, a scarf, a muffler, gloves, a stick, an umbrella, and a bag. The shape of the person is, for example, a body shape, a hairstyle, a hair color, or the like. The position of the person may be, for example, an arrangement of the person (for example, the second from the right) among a plurality of persons being captured in a case where the plurality of persons are captured by the authentication camera. The position of the person may indicate, for example, whether the person is on the right side or the left side in the video of the authentication camera 300. The direction of the person may be a direction in which the face of the person faces the authentication camera 300. The direction of the person may be a direction in which the body of the person faces the authentication camera 300.

In the case where the person being tracked corresponding to the person detected in the video of the authentication camera 300 has been specified, the detection unit 104 sends the tracking identifier of the specified person being tracked to the determination unit 105. The detection unit 104 further sends the video captured by the authentication camera 300 to the authentication unit 106 via the determination unit 105, for example. The detection unit 104 may send the video captured by the authentication camera 300 to the determination unit 105. Then, the determination unit 105 may receive the video from the detection unit 104 and send the received video to the authentication unit 106 to be described below.

For example, a video captured by the authentication camera 300, which is to be sent by the detection unit 104 to the authentication unit 106 via the determination unit 105, is also referred to as an iris authentication image. The detection unit 104 may extract a frame suitable for iris authentication from the video captured by the authentication camera 300, and send image data of the extracted frame to the determination unit 105 as an iris authentication image. The detection unit 104 may extract a frame in which the size of the pupil is larger than a predetermined size and sharpness of a pupil region satisfies a predetermined criterion, and send the extracted frame to the determination unit 105. The detection unit 104 may determine the sharpness of the pupil region on the basis of an amount of edges detected by applying an edge detection filter to the pupil region. The detection unit 104 may evaluate the sharpness of the pupil region by any of various existing methods for evaluating the sharpness of an image and various existing methods for determining whether a predetermined region of an image is in focus.

In a case where a video suitable for the iris authentication has not been obtained by the authentication camera 300, the detection unit 104 may send an instruction to the control unit 109 to control the authentication camera 300 to acquire a video of the iris.

As will be described below, in the case where the video suitable for the iris authentication has not been obtained by the authentication camera 300, the determination unit 105 may be configured to send the instruction to the control unit 109 to control the authentication camera 300 to acquire the video of the iris. In the case where the video suitable for the iris authentication has not been obtained by the authentication camera 300, the detection unit 104 may not be configured to send the instruction to the control unit 109 to control the authentication camera 300 to acquire the video of the iris. Moreover, in the case where the video suitable for the iris authentication has not been obtained by the authentication camera 300, the detection unit 104 need not send the iris authentication image to the determination unit 105 (specifically, to the authentication unit 106 via the determination unit 105). In the case where the video suitable for the iris authentication has not been obtained by the authentication camera 300, the detection unit 104 need not send the iris authentication image to the determination unit 105. For example, the detection unit 104 may send, to the determination unit 105, information indicating that the iris authentication image is not sent.

Determination Unit 105

The determination unit 105 receives the tracking identifier from the detection unit 104. The determination unit 105 may further receive the iris authentication image from the detection unit 104. The determination unit 105 may receive the iris authentication image from the control unit 109. The determination unit 105 determines whether the iris authentication has been performed for the candidate person on the basis of the received tracking identifier and the record of the iris authentication performed for the person being tracked (that is, the above-described authentication record information). Specifically, the determination unit 105 may determine whether the received tracking identifier is included in the authentication record information. Then, in a case where the received tracking identifier is included in the authentication record information, the determination unit 105 may determine that the iris authentication has been performed for the person being tracked. In a case where the received tracking identifier is not included in the authentication record information, the determination unit 105 may determine that the iris authentication has not been performed for the person being tracked.

In a case where the authentication record information indicates that the iris authentication has been performed for the person identified by the tracking identifier but the person cannot be specified, the determination unit 105 may determine that the iris authentication has not been successful for the person being tracked.

In the case where it is determined that the iris authentication has not been performed for the person being tracked, the determination unit 105 sends the iris authentication image and the tracking identifier to the authentication unit 106. In the case where it is determined that the iris authentication has not been successful for the person being tracked, the determination unit 105 may also send the iris authentication image and the tracking identifier to the authentication unit 106.

In the case where it is determined that the iris authentication has been performed for the person being tracked, the determination unit 105 need not send the iris authentication image and the tracking identifier to the authentication unit 106. In the case where the registered person corresponding to the person being tracked is specified by the iris authentication for the person being tracked, the determination unit 105 need not send the iris authentication image and the tracking identifier to the authentication unit 106. In the case where the iris authentication image and the tracking identifier are not transmitted to the authentication unit 106, the determination unit 105 may transmit an instruction to generate an output image to the generation unit 107. In this case, the iris authentication by the authentication unit 106, which is described below, is not performed (in other words, the iris authentication is skipped).

In a case where a predetermined time or more has elapsed since the last iris authentication, the determination unit 105 may send the iris authentication image and the tracking identifier to the authentication unit 106 regardless of whether the iris authentication has been performed for the person being tracked.

In the case where the iris authentication has been performed for the person being tracked, the video suitable for the iris authentication for the person being tracked need not be obtained. Therefore, the video suitable for the iris authentication need not be obtained before determining whether the iris authentication has been performed for the person being tracked.

For example, in the case where the detection unit 104 does not send the iris authentication image and in the case where the information indicating that the detection unit 104 does not send the iris authentication image is received, the determination unit 105 may determine that the video suitable for the iris authentication has not been obtained. In the case where it is determined that the iris authentication has not been performed for the person being tracked and the video suitable for the iris authentication has not been obtained by the authentication camera 300, the determination unit 105 may send the instruction to the control unit 109 to control the authentication camera 300 to acquire the video of the iris. In the case where the determination unit 105 is configured as described above, the detection unit 104 may not be configured to send the instruction to the control unit 109 to control the authentication camera 300 to acquire the video of the iris. In this case, the determination unit 105 may receive the iris authentication image suitable for the iris authentication not from the detection unit 104 but from the control unit 109.

Authentication Unit 106

The authentication unit 106 receives the iris authentication image and the tracking identifier from the determination unit 105. In the case where the iris authentication image and the tracking identifier have been received from the determination unit 105, that is, in the case where it is determined that the iris authentication has not been performed for the person being tracked, the authentication unit 106 performs the iris authentication using the received iris authentication image. As described above, the iris authentication image is the video image captured by the authentication camera 300 (in other words, at least a part of the video). The authentication unit 106 may receive the video to be used as an iris authentication image from the acquisition unit 101. In this case, the acquisition unit 101 may send the video received from the authentication camera 300 to the authentication unit 106. In FIG. 1, a line representing transmission of the video image from the acquisition unit 101 to the authentication unit 106 is omitted for simplicity.

The authentication unit 106 detects the region of the iris in the received iris authentication image, and extracts the characteristic amount from the detected region of the iris (that is, an iris characteristic amount). The authentication unit 106 compares the extracted iris characteristic amount with an iris characteristic amount of the registered person stored in the storage unit 103. The method for comparing the iris characteristic amounts used by the authentication unit 106 may be any of various existing methods. That is, the authentication unit 106 may perform the iris authentication using any of various existing iris authentication methods. The iris characteristic amount extracted by the authentication unit 106 and the registered iris characteristic amount may be characteristic amounts determined according to the iris authentication method used by the authentication unit 106.

The authentication unit 106 updates the authentication record information as will be described below, for example, according to the result of the iris authentication. In other words, the authentication unit 106 updates the authentication record information by adding the result of the iris authentication to the authentication record information. When updating the update information, the authentication unit 106 may associate date and time when the iris authentication has been performed with the result of the iris authentication, and add the result of the iris authentication and the date and time when the iris authentication has been performed to the authentication record information.

In the case where the registered person corresponding to the person being tracked is specified by the iris authentication, the authentication unit 106 associates the above-described information indicating that the iris authentication has been performed and the person is specified with the received tracking identifier. Then, the authentication unit 106 stores the received tracking identifier and the information indicating that the iris authentication has been performed and the person is identified, which are associated with each other, in the storage unit 103 as the authentication record information. In this case, the authentication unit 106 may add the received tracking identifier and the information indicating that the iris authentication has been performed and the person is identified, which are associated with each other, to the authentication record information stored in the storage unit 103 as the result of the iris authentication. The information indicating that the iris authentication has been performed and the person is identified may be the registration identifier of the registered person corresponding to the person being tracked.

In the case where the registered person corresponding to the person being tracked cannot be specified by the iris authentication, the authentication unit 106 associates the above-described information indicating that the iris authentication has been performed but the person cannot be specified with the received tracking identifier. The information indicating that iris authentication has been performed but the person cannot be identified may be, for example, the registration identifier set to identify the unspecified person (or set to identify nobody). In this case, the authentication unit 106 stores the received tracking identifier and the information indicating that the iris authentication has been performed but the person cannot be identified, which are associated with each other, in the storage unit 103 as the authentication record information. In this case, the authentication unit 106 may add the received tracking identifier and the information indicating that the iris authentication has been performed but the person cannot be identified, which are associated with each other, to the authentication record information stored in the storage unit 103 as the result of the iris authentication.

When a predetermined time has elapsed since the iris authentication, the authentication unit 106 may delete the result of the iris authentication from the authentication record information.

After updating the authentication record information, the authentication unit 106 may send the instruction to generate the output image to the generation unit 107.

Generation Unit 107

The generation unit 107 receives the instruction to generate the output image from the determination unit 105 and the authentication unit 106. In the case of receiving the instruction to generate the output image from the determination unit 105 or the authentication unit 106, the generation unit 107 generates the output image, which will be described below in detail. Specifically, the generation unit 107 generates the output image representing the capture range of the wide-area camera 200, on which a mark is superimposed, the mark indicating the person being tracked and whether the iris authentication has been performed for the person being tracked, which will be described below in detail.

The generation unit 107 may use the video captured by the wide-area camera 200 as the image representing the capture range of the wide-area camera 200. The generation unit 107 may use a figure representing the shape of the capture range of the wide-area camera 200 as the image representing the capture range of the wide-area camera 200. The figure representing the shape of the capture range may be a view looking down the space of the capture range (for example, a room) from right above. The figure representing the shape of the capture range of the wide-area camera 200 may be used as the image representing the range. The figure representing the shape of the capture range may be a view looking the space of the capture range from diagonally above.

The generation unit 107 may generate an image having the above mark superimposed on the video captured by the wide-area camera 200 as the output image. The generation unit 107 may add the information of the person to the mark indicating the person for which the iris authentication has been performed.

The mark may be, for example, a figure such as a rectangle surrounding the detected person, a figure such as an arrow or a check mark indicating a region of the detected person, or a character representing a name. The mark may be, for example, a region of the detected person with at least one of changed color or brightness. The marking may be blinking. The color or size of the mark may change over time.

To discriminate the person for which the iris authentication has been performed and the person for which the iris authentication has not been performed, the generation unit 107 uses, as the mark indicating that the person for which the iris authentication has been performed, a mark distinguishable from the mark indicating the person for which the iris authentication has not been performed. The generation unit 107 may use, as a mark indicating a person for which the corresponding registered person has been specified by the iris authentication, a mark distinguishable from a mark indicating a person for which the corresponding registered person has not been specified by the iris authentication. Hereinafter, the mark indicating the person for which the iris authentication has not been performed is referred to as an unauthenticated mark. The mark indicating the person for which the iris authentication has been performed is referred to as an authenticated mark. The mark indicating the person for which the corresponding registered person has been specified by the iris authentication is referred to as a specified mark. The mark indicating the person for which the corresponding registered person has not been specified by the iris authentication is referred to as an unspecified mark. The authenticated mark includes the specified mark and the unspecified mark.

The unauthenticated mark, the specified mark, and the unspecified mark may be different in at least any one of color, line thickness, size, shape, added character, or character string. The unauthenticated mark, the specified mark, and the unspecified mark may be different in the frequency of blinking, the pattern of blinking, and the pattern of change in color or size.

In the case of superimposing the mark that changes over time such as the blinking mark or the mark with changed color or size on the output image, the generation unit 107 changes the color or size of the mark indicating the same person among the consecutive frames of the output image so that the mark appears to change. In the case of superimposing the changing mark on an image in which the state of the person such as the position of the person is unchanged for a longer time than a frame interval of the moving image, the generation unit 107 may similarly superimpose the changing mark on the moving image in which the same frame continues.

Figure 3:
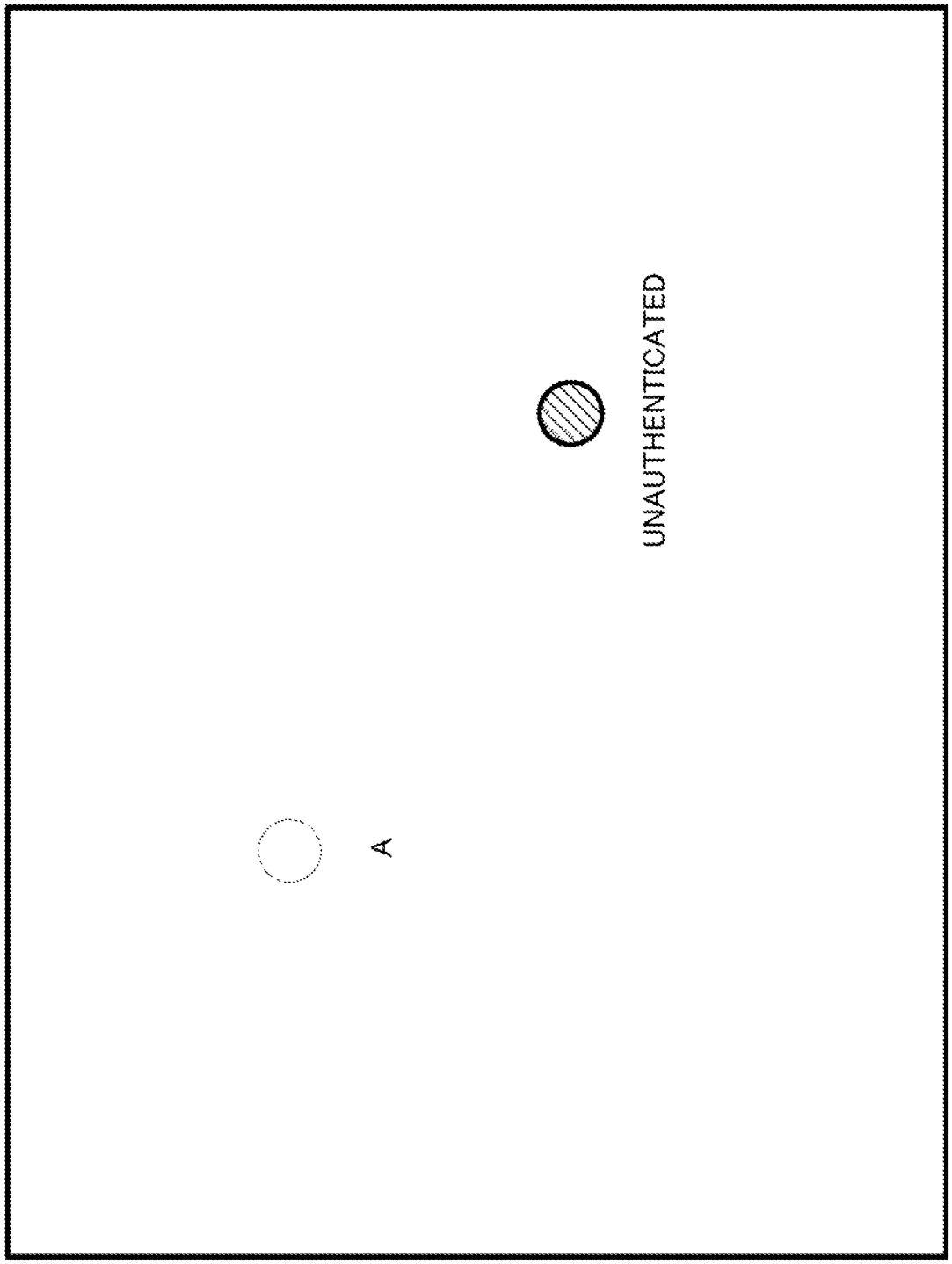
FIG. 3 is a diagram schematically illustrating an example of an output image.

FIG. 3 is a diagram schematically illustrating an example of the output image. The example illustrated in FIG. 3 represents an image of looking down a rectangular room in which two persons exist from the above. The upper left circle represents a person for which the iris authentication has been performed, and the name has been specified as "A" by the iris authentication. The lower right circle represents a person for which the iris authentication has not been performed.

Figure 4:
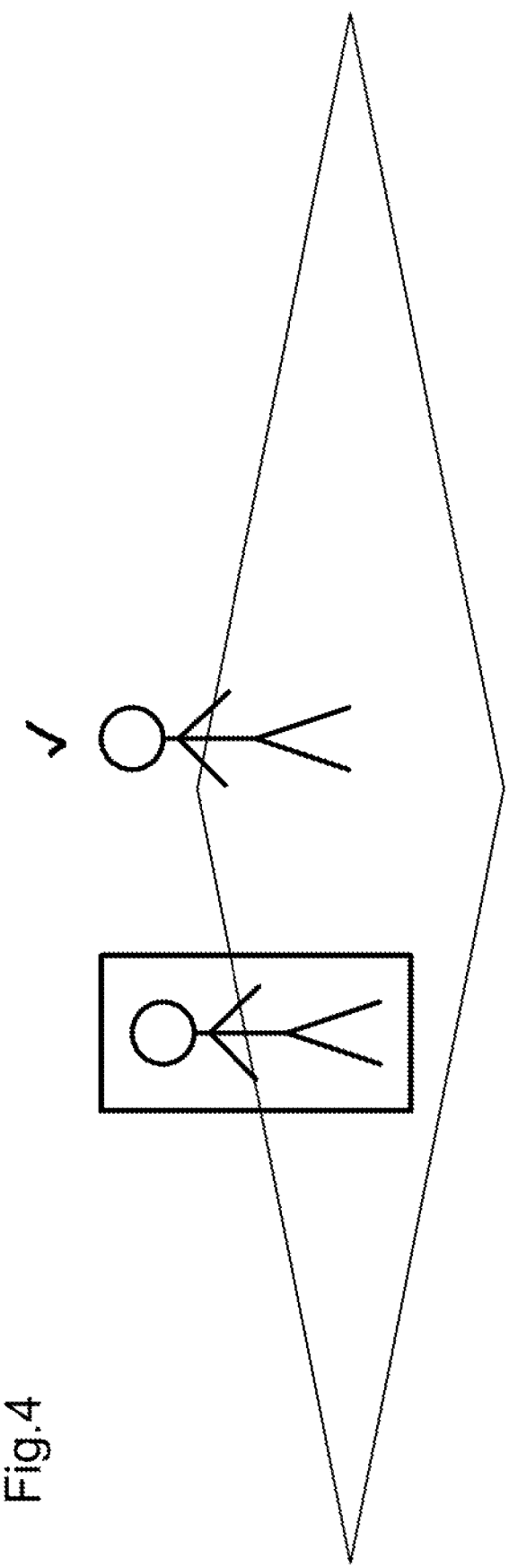
FIG. 4 is a diagram schematically illustrating an example of an output image.

FIG. 4 is a diagram schematically illustrating an example of the output image. The example illustrated in FIG. 4 represents a state of an image having marks superimposed on a video of a rectangular room in which two persons exist captured by the wide-area camera 200 from obliquely above. The person surrounded by the rectangle on the left side in FIG. 4 represents a person for which the iris authentication has not been performed. The person with the check mark on the head on the right side in FIG. 4 represents a person for which the iris authentication has been performed.

The generation unit 107 sends the generated output image to the output unit 108.

Output Unit 108

The output unit 108 receives the output image from the generation unit 107, and outputs the received output image to, for example, the display device 400.

Control Unit 109

The control unit 109 may receive the instruction to control the authentication camera 300 to acquire the video of the iris from the detection unit 104. The control unit 109 may receive the instruction to control the authentication camera 300 to acquire the video of the iris from the determination unit 105. In the case of receiving the instruction to control the authentication camera 300 to acquire the video of the iris, the control unit 109 may instruct the authentication camera 300 to capture the video. The control unit 109 may receive an image captured by the authentication camera 300 from the acquisition unit 101. The control unit 109 determines whether the image captured by the authentication camera 300 and received from the acquisition unit 101 is suitable for the iris authentication. The method for determining whether the image is suitable for the iris authentication used by the control unit 109 may be the same as the method for determining whether a video is suitable for the iris authentication used by the detection unit 104.

In the case where the image captured by the authentication camera 300 and received from the acquisition unit 101 is not suitable for the iris authentication, the control unit 109 controls the authentication camera 300 to capture the iris of the candidate person.

Specifically, the control unit 109 may wait until the face of the candidate person to be captured by the authentication camera 300 faces the authentication camera 300. The control unit 109 may wait until a line of sight of the candidate person to be captured by the authentication camera 300 faces the authentication camera 300. More specifically, the control unit 109 estimates the direction of the face or the direction of the line of sight of the candidate person in the video captured by the authentication camera 300. For example, in a case where an angle made by the estimated direction and an optical axis of the authentication camera 300 is a predetermined angle or less, the control unit 109 may determine that the face (or the line of sight) of the candidate person faces the authentication camera 300. The control unit 109 may detect the pupil region and approximate the shape of an outer periphery of the pupil by an ellipse in the video captured by the authentication camera 300. Then, in a case where the eccentricity of the obtained ellipse is a predetermined value or less, the control unit 109 may determine that the face (or the line of sight) of the candidate person faces the authentication camera 300.

In the case where the face (or the line of sight) of the candidate person faces the authentication camera 300, the control unit 109 detects the pupil region if the pupil region has not yet been detected. The control unit 109 further controls the direction of the authentication camera 300 so that the position of the pupil region in the video captured by the authentication camera 300 comes at or near the center of the captured video. Specifically, the control unit 109 estimates rotation of the authentication camera 300 for moving the position of the pupil region in the captured video to the center of the video on the basis of the detected position of the pupil in the video and the parameters of the authentication camera 300. The control unit 109 transmits an instruction to perform the estimated rotation to the authentication camera 300. The authentication camera 300 changes the direction according to the received instruction.

The control unit 109 further determines whether the size (for example, the major axis) of the pupil region is larger than a prescribed size. The control unit 109 estimates the focal length of the authentication camera 300 for making the size of the pupil region in the captured video to be larger than the predetermined size on the basis of the size of the pupil region and the parameters of the authentication camera 300. The control unit 109 transmits an instruction to change the focal length to the estimated focal length to the authentication camera 300. The authentication camera 300 changes the focal length according to the received instruction.

In the case of receiving the instruction to control the authentication camera 300 to acquire the video of the iris from the determination unit 105, the control unit 109 receives the image captured by the authentication camera 300 and acquired by the acquisition unit 101 after transmitting the instruction from the acquisition unit 101. The control unit 109 determines whether the received image is suitable for the iris authentication. In the case where it is determined that the received image is suitable for the iris authentication, the control unit 109 sends the received image to the determination unit 105 as the iris authentication image.

In the case where it is determined that the received image is not suitable for the iris authentication, the control unit 109 may estimate the rotation and focal length again and transmit the instruction to perform the estimated rotation and the instruction to change the focal length to the estimated focal length to the authentication camera 300. The control unit 109 may determine whether the received image is in focus. In the case where it is determined that the received image is not in focus, the control unit 109 may transmit an instruction to redo focusing to the authentication camera 300. The authentication camera 300 may redo focusing according to the received instruction.

Operation

Next, an operation of the authentication system 10 of the example embodiment will be described in detail with reference to the drawings.

Figure 5:
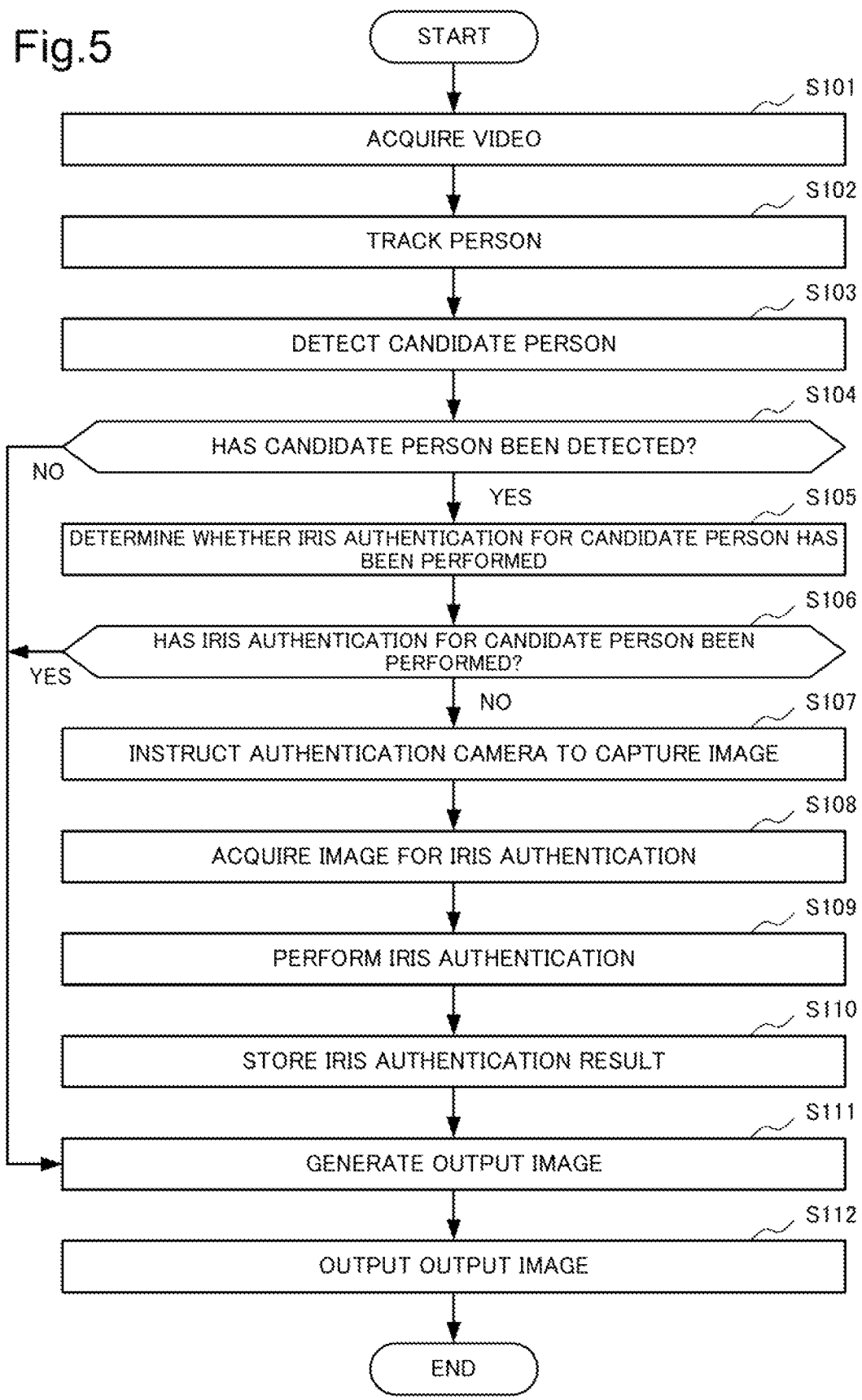
FIG. 5 is a flowchart illustrating an example of an operation of the authentication system according to the first example embodiment.

FIG. 5 is a flowchart illustrating an example of an operation of the authentication system 10 of the example embodiment. The authentication system 10 may start the operation illustrated in FIG. 5 by an operator of the authentication system 10, for example. The authentication system 10 may repeat the operation illustrated in FIG. 5 until an instruction to terminate the operation is given by the operator of the authentication system 10, for example.

In the operation illustrated in FIG. 5, first, the acquisition unit 101 acquires the video captured by the wide-area camera 200 from the wide-area camera 200 (step S101). The acquisition unit 101 may further acquire the video image captured by the authentication camera 300 from the authentication camera 300.

Next, the tracking unit 102 tracks the person included in the video captured by the wide-area camera 200 and received from the wide-area camera 200 (step S102).

The detection unit 104 detects the above-described candidate person on the basis of the parameters and positional relationship between the wide-area camera 200 and the authentication camera, for example (step S103). The detection unit 104 may detect the candidate person on the basis of the video of the wide-area camera 200 and the video of the authentication camera 300.

In the case where no candidate person is detected (NO in step S104), the authentication system 10 then performs the operation of step S111. In the case where the candidate has been detected (YES in step 104), the determination unit 105 determines whether the iris authentication for the candidate person has already been performed (step S105).

In the case where a plurality of candidate persons has been detected in step S103, the authentication system 10 may perform the operations from step S105 to step S110 for each of the detected candidate persons.

In the case where the iris authentication for the candidate person has been performed (YES in step S106), the authentication system 10 then performs the operation of step S111. In the case where the iris authentication has not been performed for the candidate person (NO in step S106), the control unit 109 may instruct the authentication camera 300 to capture a video (step S107). In the case where the iris authentication image suitable for the iris authentication has already been acquired in step S101, the authentication system 10 need not perform the operation of step S107 and step S108. In this case, for example, the detection unit 104 sends the iris authentication image to the authentication unit 106 via the determination unit 105.

The acquisition unit 101 acquires the iris authentication image from the authentication camera 300 (step S108). In step S108, for example, the control unit 109 may determine whether the image captured by the authentication camera 300 is suitable for the iris authentication. In the case where it is determined that the image captured by the authentication camera 300 is not suitable for the iris authentication, the control unit 109 may control the authentication camera 300 to capture the image suitable for the iris authentication. In this case, the control unit 109 may send the iris authentication image suitable for the iris authentication to the authentication unit 106 via the determination unit 105, for example.

Next, the authentication unit 106 performs the iris authentication for the candidate person (step S109). The authentication unit 106 stores the result of the iris authentication in the storage unit 103 (step S110). In other words, the authentication unit 106 updates the record of the iris authentication (that is, the above-described authentication record information) according to the result of the iris authentication.

Next, the generation unit 107 generates the output image on the basis of the tracking information and the record of the iris authentication (step S111). Then, the output unit 108 outputs the generated output image (step S112).

Effect

The above-described example embodiment has the effect of suppressing the increase in the arithmetic amount for biometric authentication in the case where an object such as a person is repeatedly biometrically authenticated by the iris authentication or the like. This is because the determination unit 105 determines whether the iris authentication has already been performed for the candidate person who is the candidate for the iris authentication and is the person being tracked. Then, this is because the authentication unit 106 does not perform the iris authentication for the candidate person in the case where the iris authentication has been performed for the candidate person. Therefore, the iris authentication need not be repeatedly performed in the case where the same person is repeatedly authenticated by the iris authentication and, thus, the increase in the arithmetic amount for the iris authentication can be suppressed.

Modification

In the above-described example embodiment, the authentication is the iris authentication, and the object to be authenticated is a person. The example embodiment can be applied to various authentications in which authentication can be performed using a video captured by a camera, such as face authentication or gait identification. The authentication method may be any of various existing methods. Furthermore, the object to be authenticated may not necessarily be a person. The object to be authenticated may be, for example, an animal in a space such as a ranch surrounded by a fence. The authentication method in this case may be a method suitable for the object to be authenticated. For example, in a case where the object to be authenticated is a cow, the authentication may be performed by using a muzzle pattern that is a pattern of irregularities in the nose. Furthermore, in the case where the object to be authenticated is an animal having a pattern specific to individual fur, authentication may be based on the consistency of the pattern specific to the individual fur.

Second Example Embodiment

Hereinafter, a second example embodiment will be described in detail with reference to the drawings.

Configuration

Figure 6:
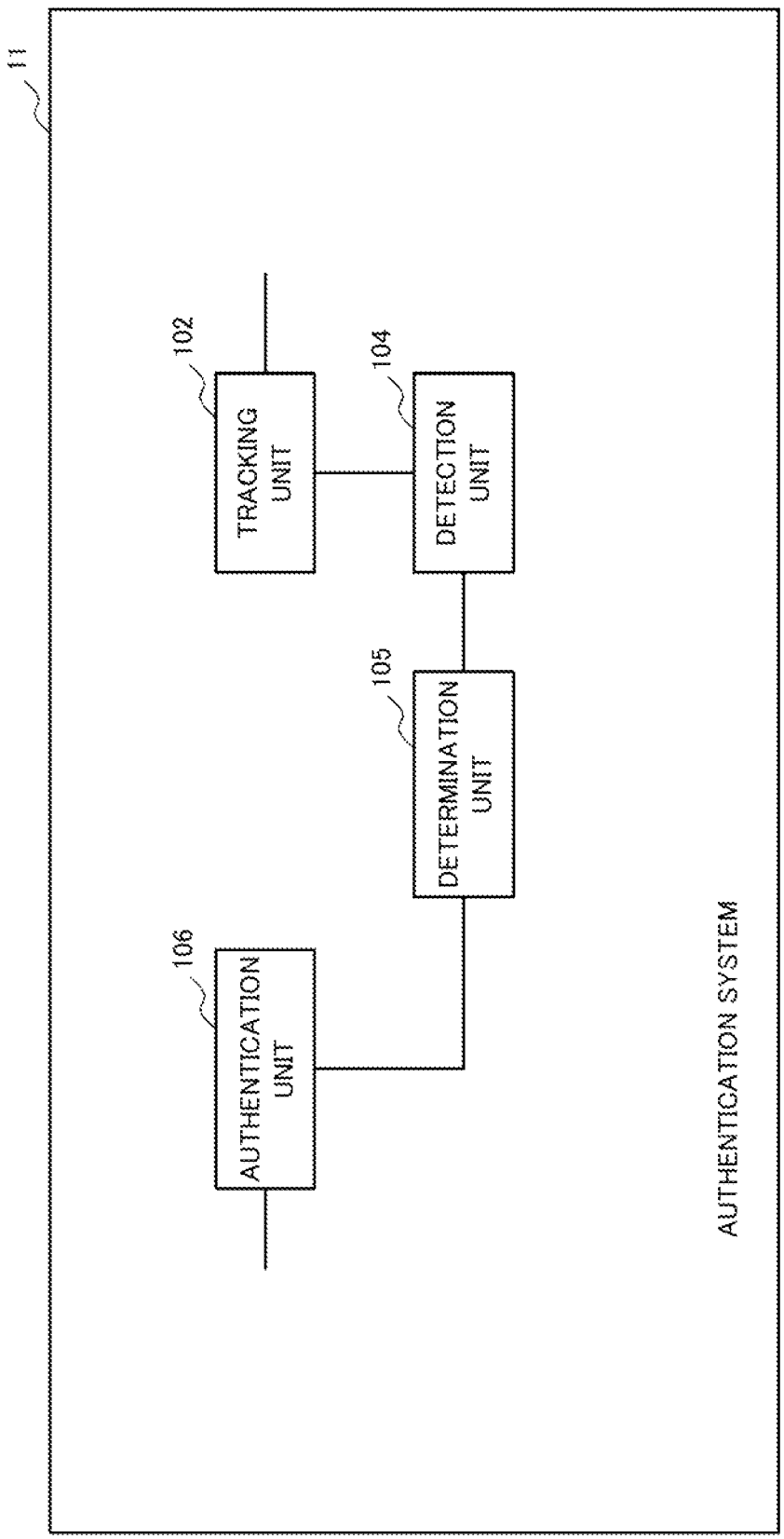
FIG. 6 is a block diagram illustrating an example of a configuration of an authentication system according to a second example embodiment.

A configuration of an authentication system 11 according to the example embodiment will be described. FIG. 6 is a block diagram illustrating an example of a configuration of the authentication system 11 according to the example embodiment.

As illustrated in FIG. 6, the authentication system 11 of the example embodiment includes a tracking unit 102, a detection unit 104, a determination unit 105, and an authentication unit 106.

The tracking unit 102 tracks an object included in a video captured by a first capture device. The detection unit 104 detects a candidate of biometric authentication in the objects being tracked. The determination unit 105 determines whether biometric authentication has been performed for the candidate on the basis of a record of the biometric authentication performed for the object being tracked. In a case where it is determined that the biometric authentication has not been performed for the candidate, the authentication unit 106 performs the biometric authentication for the candidate on the basis of a video of an authentication part of the candidate captured by a second capture device. A capture range of the second capture device is a part of a capture range of the first capture device. The first capture device of the example embodiment corresponds to the wide-area camera 200 of the first example embodiment. The second capture device of the example embodiment corresponds to the authentication camera 300 of the first example embodiment.

In the example embodiment, the object is, for example, a person. The authentication part is a site used for authentication. The site is, for example, a part of a body. The authentication part is, for example, an iris. The authentication is, for example, biometric authentication. The biometric authentication is, for example, iris authentication. Note that the example embodiment is not limited to the above-described examples.

Operation

Figure 7:
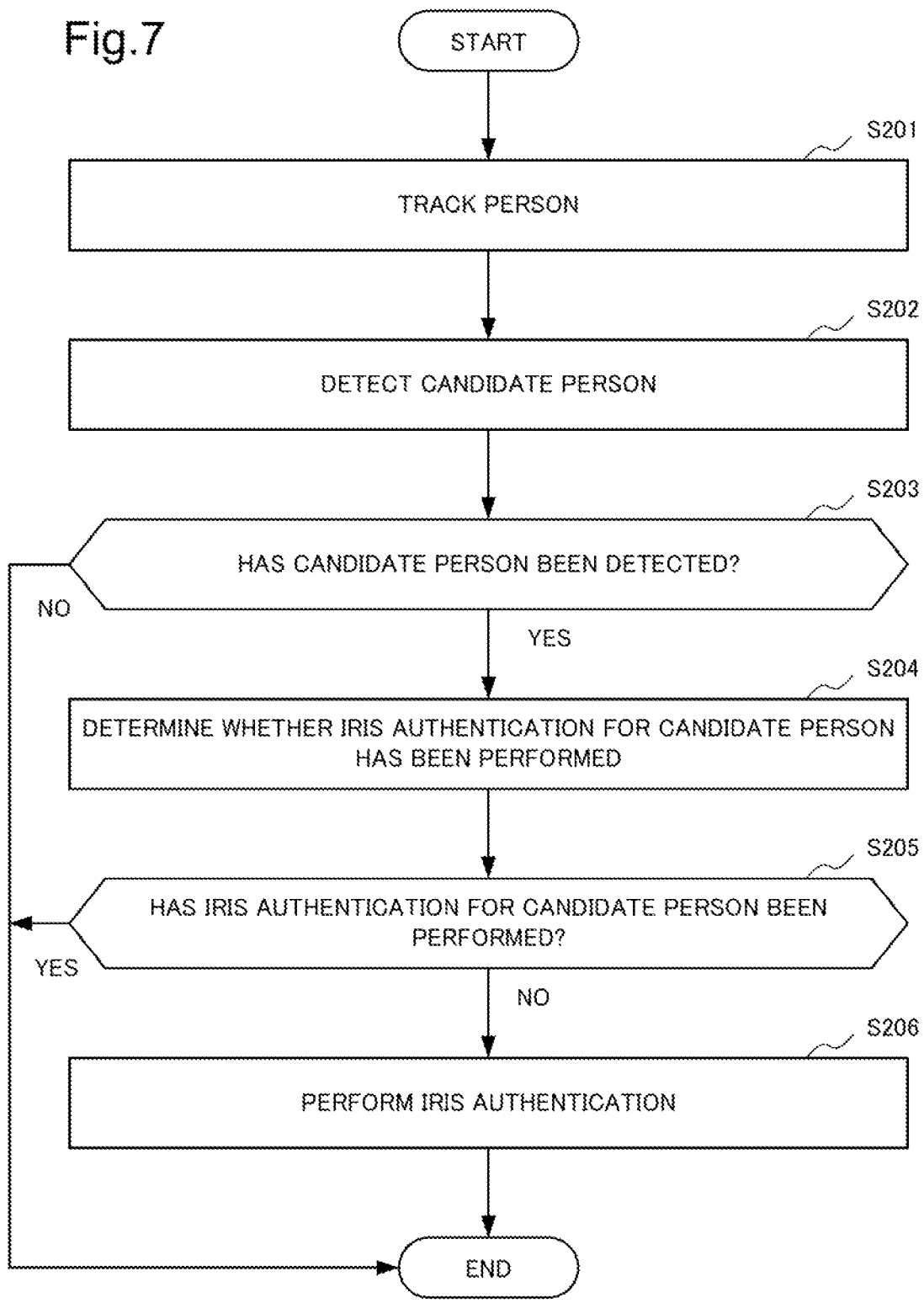
FIG. 7 is a flowchart illustrating an example of an operation of the authentication system according to the second example embodiment.

Next, an operation of the authentication system 11 according to the example embodiment will be described. Hereinafter, a case in which the object is a person, the authentication part is an iris, and the authentication is iris authentication will be described. FIG. 7 is a flowchart illustrating an example of an operation of the authentication system 11 of the example embodiment. The authentication system 11 may start the operation illustrated in FIG. 7 by an operator's operation, for example. The authentication system 11 may repeat the operation illustrated in FIG. 7 until the operator instructs termination of the operation, for example.

In the operation illustrated in FIG. 7, the tracking unit 102 tracks the person in the video captured by the first capture device (for example, a wide-area camera 200) (step S201). Next, the detection unit 104 detects a candidate person (Step S202). In the case where no candidate person is detected (NO in step S203), the authentication system 11 terminates the operation in FIG. 7.

In the case where the candidate person has been detected (YES in step S203), the determination unit 105 determines whether the iris authentication has been performed for the detected candidate person on the basis of the record of the iris authentication performed for the person being tracked (step S204). In the case where the iris authentication has been performed for the candidate person, in other words, in the case where the iris authentication for the candidate person has been performed (YES in step S205), the authentication system 11 terminates the operation in FIG. 7.

In the case where the iris authentication has not been performed for the candidate person, in other words, in the case where the iris authentication for the candidate person has not been performed (NO in step S205), the authentication unit 106 performs the iris authentication for the candidate person using the video captured by the second capture device (for example, the authentication camera 300) (step S206).

Effect

The example embodiment has the same effect as the first example embodiment. The reason is the same as the reason why the effect of the first example embodiment is exhibited.

Third Example Embodiment

Hereinafter, a third example embodiment will be described in detail with reference to the drawings.

Configuration

Figure 8:
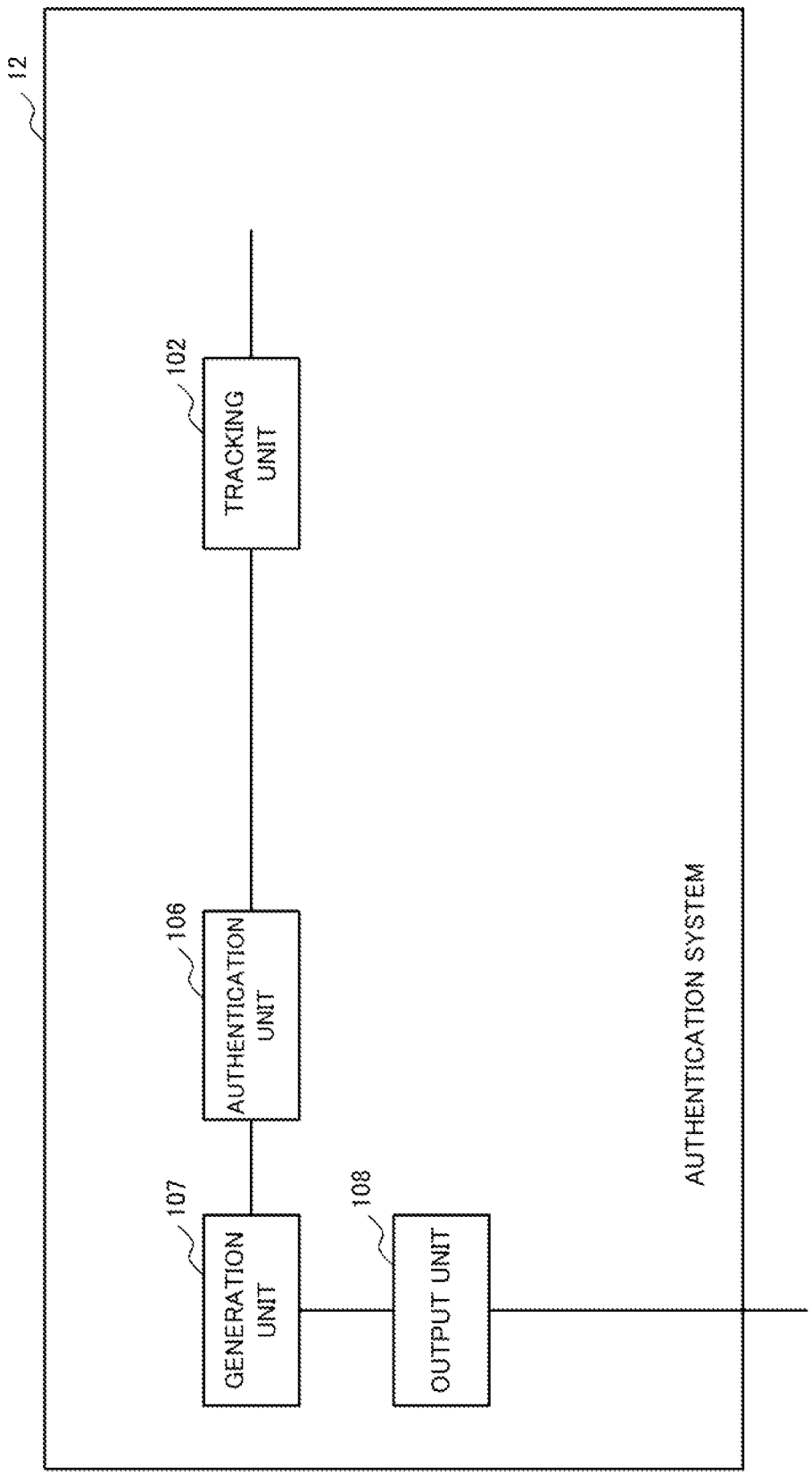
FIG. 8 is a block diagram illustrating an example of a configuration of an authentication system according to a third example embodiment.

First, a configuration of the example embodiment will be described. FIG. 8 is a block diagram illustrating an example of a configuration of an authentication system 12 according to the example embodiment.

The authentication system 12 according to the example embodiment includes a tracking unit 102, an authentication unit 106, a generation unit 107, and an output unit 108.

The tracking unit 102 tracks an object included in a video captured by a first capture device. The authentication unit 106 performs biometric authentication for a candidate among the objects being tracked, on the basis of a video of an authentication part of the candidate captured by a second capture device having a capture range in a part of a capture range of the first capture device. The generation unit 107 generates an output image representing the capture range of the first capture device on which a mark is superimposed, the mark indicating the object being tracked and whether the biometric authentication has been performed for the object being tracked, on the basis of a record of the biometric authentication performed for the object being tracked. The output unit 108 outputs the generated output image. The first capture device of the example embodiment corresponds to the wide-area camera 200 of the first example embodiment. The second capture device of the example embodiment corresponds to the authentication camera of the first example embodiment.

In the example embodiment, the object is, for example, a person. The authentication part is a site used for authentication. The site is, for example, a part of a body. The authentication part is, for example, an iris. The authentication is, for example, biometric authentication. The biometric authentication is, for example, iris authentication. Note that the example embodiment is not limited to the above-described examples.

Operation

Figure 9:
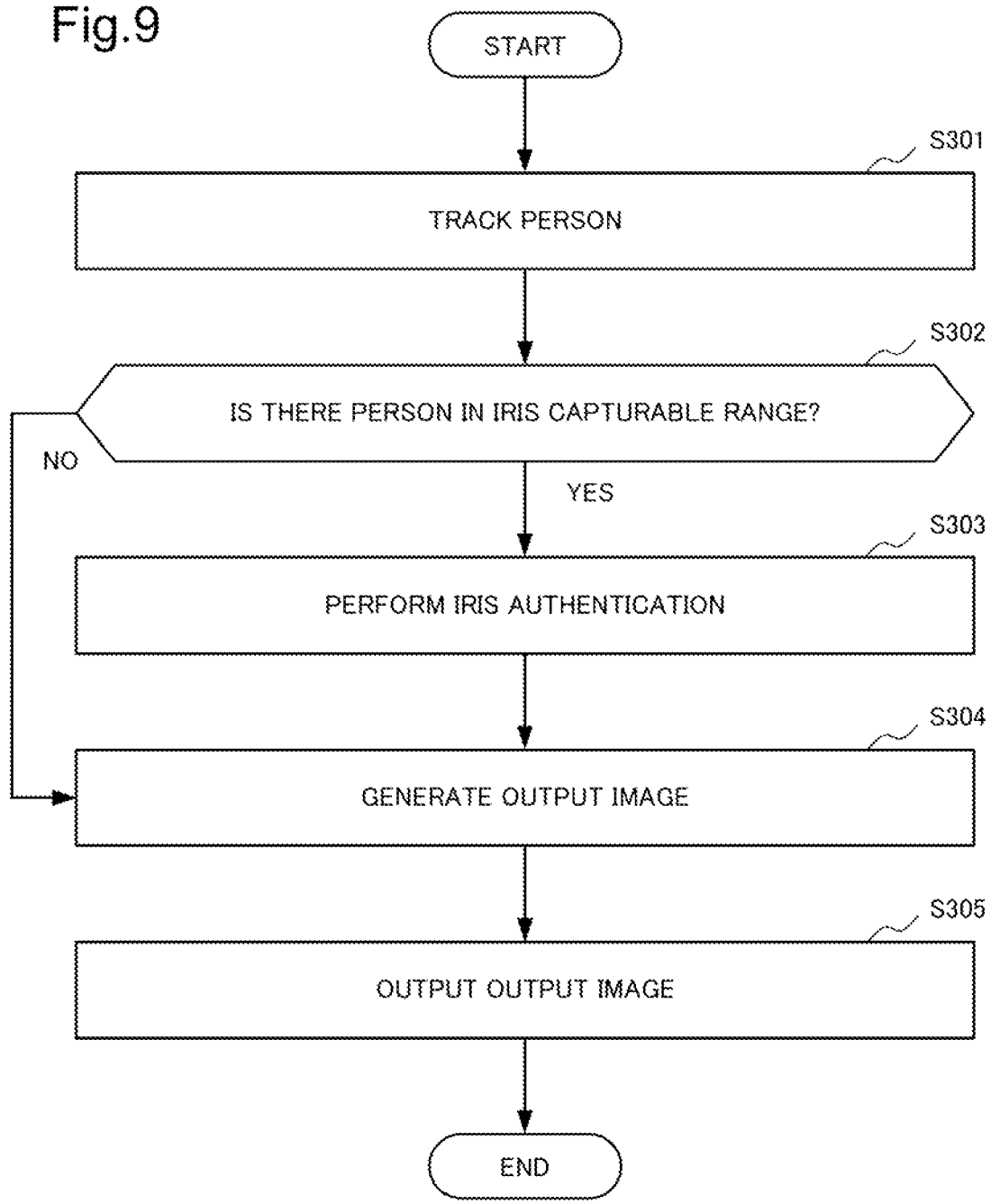
FIG. 9 is a flowchart illustrating an example of an operation of the authentication system according to the third example embodiment.

Next, an operation of the example embodiment will be described. Hereinafter, a case in which the object is a person, the authentication part is an iris, and the authentication is iris authentication will be described. FIG. 9 is a flowchart illustrating an example of an operation of the authentication system 12 according to the example embodiment. The authentication system 12 may start the operation illustrated in FIG. 9 by an operator's operation, for example. The authentication system 12 may repeat the operation illustrated in FIG. 9 until the operator instructs termination of the operation, for example.

In the operation illustrated in FIG. 9, the tracking unit 102 tracks the person in the video captured by the first capture device (for example, a wide-area camera 200) (step S301). In a case where no person is present in a range in which the iris can be captured (NO in step S302), the authentication system 12 then performs the operation of step S304.

In a case where a person is present in the range in which the iris can be captured (YES in step S302), the authentication unit 106 performs the iris authentication for the candidate person using the video captured by the second capture device (for example, an authentication camera 300) (step S303). The authentication system 12 then performs the operation of step S304.

The generation unit 107 generates an output image representing the capture range of the first capture device on which the mark is superimposed, the mark indicating the person being tracked and whether the iris authentication has been performed for the person being tracked, on the basis of a record of the iris authentication performed for the person being tracked (step S304). The generation unit 107 may generate an output image similar to the generation unit 107 of the first example embodiment.

The output unit 108 outputs the generated output image to, for example, a display device or the like (step S305). Then, the authentication system 12 terminates the operation illustrated in FIG. 7.

Effect

The example embodiment has an effect of easily grasping a person for which the biometric authentication such as the iris authentication has not been performed. This is because the generation unit 107 generates the output image representing the capture range of the first capture device on which the mark is superimposed, the mark indicating the person being tracked and whether the iris authentication has been performed for the person being tracked. Then, the output unit 108 outputs the generated output image.

Other Example Embodiments

The authentication device 100 of the authentication system 10 of the first example embodiment, the authentication system 11 of the second example embodiment, and the authentication system 12 of the third example embodiment can be implemented by a computer including a processor that executes a program loaded on a memory. The authentication device 100 of the authentication system 10 of the first example embodiment, the authentication system 11 of the second example embodiment, and the authentication system 12 of the third example embodiment can be implemented by special hardware such as a circuit. The authentication device 100 of the authentication system 10 of the first example embodiment, the authentication system 11 of the second example embodiment, and the authentication system 12 of the third example embodiment can be implemented by a combination of the above-described computer and special hardware. The above-described computer may be a plurality of computers that is communicatively connected. The above-described special hardware may be a plurality of communicatively connected circuits.

Figure 10:
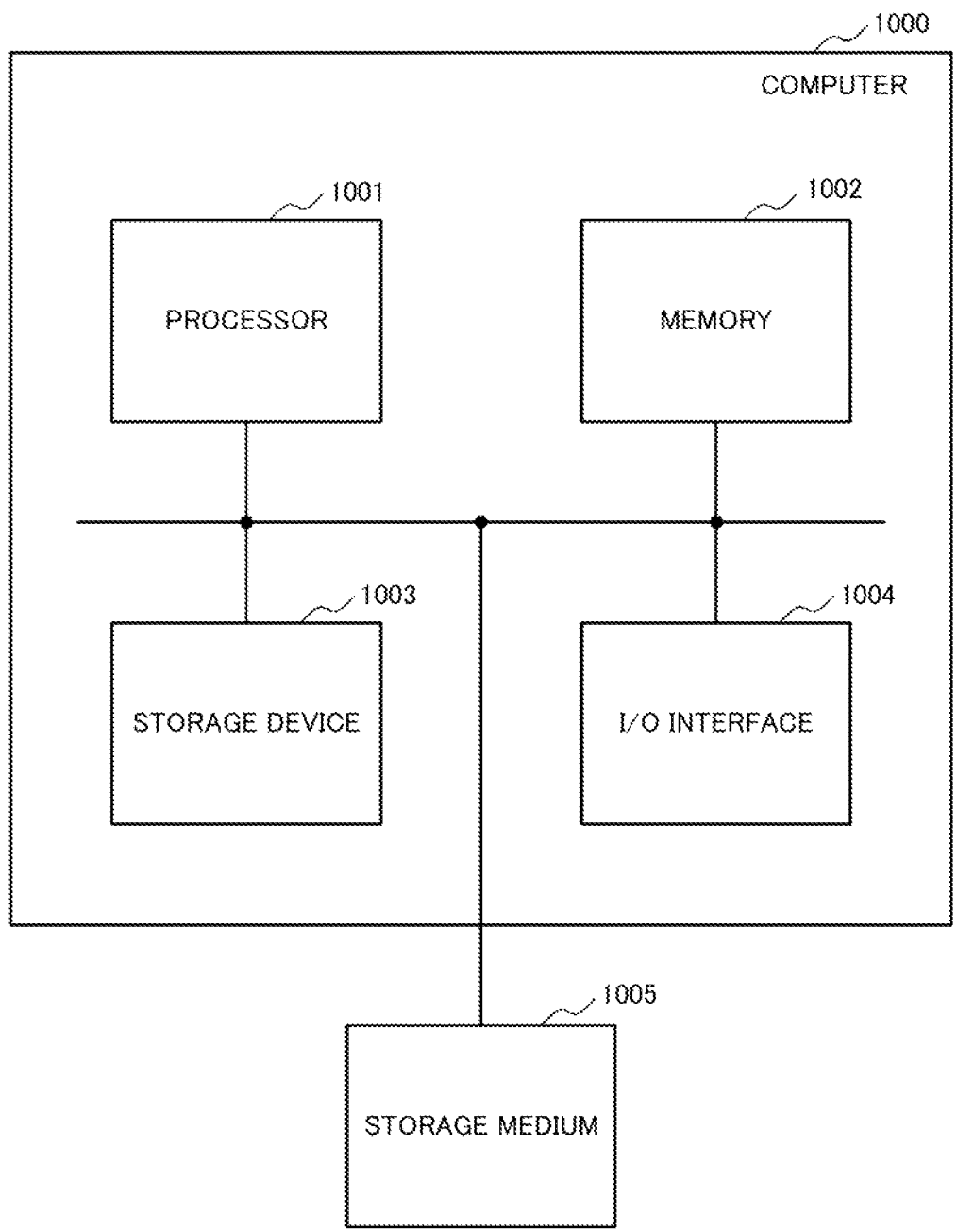
FIG. 10 is a block diagram illustrating an example of a hardware configuration of a computer capable of implementing an authentication system and an authentication device according to an example embodiment.

FIG. 10 is a block diagram illustrating an example of a hardware configuration of a computer 1000 capable of implementing the authentication device 100 pf the authentication system 10, the authentication system 11, and the authentication system 12.

A computer 1000 includes a processor 1001, a memory 1002, a storage device 1003, and an input/output (I/O) interface 1004. Furthermore, the computer 1000 can also access a storage medium 1005. The memory 1002 and the storage device 1003 are, for example, storage devices such as a random access memory (RAM) and a hard disk. The storage medium 1005 is, for example, a storage device such as a RAM or a hard disk, a read only memory (ROM), or a portable storage medium. The storage device 1003 may be the storage medium 1005. The processor 1001 can read and write data and programs to and from the memory 1002 and the storage device 1003. The processor 1001 can access the wide-area camera 200, the authentication camera 300, and the display device 400 via the I/O interface 1004, for example. Processor 1001 can access storage medium 1005. The storage medium 1005 stores a program for operating the computer 1000 as either the authentication device or the authentication system according to the above-described example embodiments.

The processor 1001 loads the program read from the storage medium 1005 into the memory 1002 and executes the program loaded into the memory 1002. Thus, the computer 1000 operates as either the authentication device or the authentication system according to the above-described example embodiments.

Specifically, the acquisition unit 101, the tracking unit 102, the detection unit 104, the determination unit 105, the authentication unit 106, the generation unit 107, and the output unit 108 are implemented by the processor 1001 for executing the program loaded in the memory 1002, for example. The storage unit 103 is implemented by, for example, the memory 1002 or the storage device 1003. Some or all of the acquisition unit 101, the tracking unit 102, the storage unit 103, the detection unit 104, the determination unit 105, the authentication unit 106, the generation unit 107, and the output unit 108 can be implemented by the special hardware such as a circuit.

Furthermore, some or all of the above example embodiments can be described as but are not limited to the supplementary notes below.

(Supplementary Note 1)

An authentication system including:

tracking means for tracking an object included in a video captured by a first capture device;

detection means for detecting a candidate in objects being tracked;

determination means for determining whether biometric authentication has been performed for the candidate based on a record of biometric authentication performed for the object being tracked; and authentication means for performing the biometric authentication for the candidate based on a video of an authentication part of the candidate captured by a second capture device having a capture range in a part of a capture range of the first capture device, in a case where it is determined that the biometric authentication has not been performed for the candidate.

(Supplementary Note 2)

The authentication system according to supplementary note 1, in which the authentication means does not perform the biometric authentication for the candidate in a case where it is determined that the biometric authentication has been performed for the candidate.

(Supplementary Note 3)

The authentication system according to supplementary note 1 or 2, further including:

control means for controlling the second capture device to capture the authentication part of the candidate in the case where it is determined that the biometric authentication has not been performed for the candidate.

(Supplementary Note 4)

The authentication system according to any one of supplementary notes 1 to 3, further including:

generation means for generating an output image representing the capture range of the first capture device on which a mark is superimposed, the mark indicating the object being tracked and whether biometric authentication has been performed for the object being tracked; and output means for outputting the generated output image.

(Supplementary Note 5)

The authentication system according to supplementary note 4, in which the generation means generates the output image by superimposing the mark on the video captured by the first capture device.

(Supplementary Note 6)

The authentication system according to supplementary note 4 or 5, in which the generation means superimposes the mark to which information of the object is added on the output image as the mark indicating that the object for which biometric authentication has been performed.

(Supplementary Note 7)

The authentication system according to any one of supplementary notes 1 to 6, including:

the first capture device; and the second capture device.

(Supplementary Note 8)

An authentication system including:

tracking means for tracking an object included in a video captured by a first capture device;

authentication means for performing biometric authentication for a candidate among the objects being tracked based on a video of an authentication part of the candidate captured by a second capture device having a capture range in a part of a capture range of the first capture device;

generation means for generating an output image representing the capture range of the first capture device on which a mark is superimposed, the mark indicating the object being tracked and whether biometric authentication has been performed for the object being tracked, based on a record of the biometric authentication performed for the object being tracked; and output means for outputting the generated output image.

(Supplementary Note 9)

The authentication system according to any one of supplementary notes 1 to 8, in which the authentication part is an iris, and the biometric authentication is iris authentication.

(Supplementary Note 10)

An authentication method including:

tracking an object included in a video captured by a first capture device;

detecting a candidate in objects being tracked;

determining whether biometric authentication has been performed for the candidate based on a record of biometric authentication performed for the object being tracked; and performing the biometric authentication for the candidate based on a video of an authentication part of the candidate captured by a second capture device having a capture range in a part of a capture range of the first capture device, in a case where it is determined that the biometric authentication has not been performed for the candidate.

(Supplementary Note 11)

The authentication method according to supplementary note 10, in which the biometric authentication is not performed for the candidate in a case where it is determined that the biometric authentication has been performed for the candidate.

(Supplementary Note 12)

The authentication method according to supplementary note 10 or 11, further including:

controlling the second capture device to capture the authentication part of the candidate in the case where it is determined that the biometric authentication has not been performed for the candidate.

(Supplementary Note 13)

The authentication method according to any one of supplementary notes 10 to 12, further including:

generating an output image representing the capture range of the first capture device on which a mark is superimposed, the mark indicating the object being tracked and whether biometric authentication has been performed for the object being tracked; and outputting the generated output image.

(Supplementary Note 14)

The authentication method according to supplementary note 13, in which the output image is generated by superimposing the mark on the video captured by the first capture device.

(Supplementary Note 15)

The authentication method according to supplementary note 13 or 14, in which the mark to which information of the object is added is superimposed on the output image as the mark indicating that the object for which biometric authentication has been performed.

(Supplementary Note 16)

An authentication method including:

tracking an object included in a video captured by a first capture device;

performing biometric authentication for a candidate among objects being tracked based on a video of an authentication part of the candidate captured by a second capture device having a capture range in a part of a capture range of the first capture device;

generating an output image representing the capture range of the first capture device on which a mark is superimposed, the mark indicating the object being tracked and whether biometric authentication has been performed for the object being tracked, based on a record of the biometric authentication performed for the object being tracked; and outputting the generated output image.

(Supplementary Note 17)

The authentication method according to any one of supplementary notes 10 to 16, in which the authentication part is an iris, and the biometric authentication is iris authentication.

(Supplementary Note 18)

A storage medium storing a program for causing a computer to execute:

tracking processing of tracking an object included in a video captured by a first capture device;

detection processing of detecting a candidate in the objects being tracked;

determination processing of determining whether biometric authentication has been performed for the candidate based on a record of biometric authentication performed for the object being tracked; and authentication processing of performing the biometric authentication for the candidate based on a video of an authentication part of the candidate captured by a second capture device having a capture range in a part of a capture range of the first capture device, in a case where it is determined that the biometric authentication has not been performed for the candidate.

(Supplementary Note 19)

The storage medium according to supplementary note 18, in which the authentication processing does not include performing the biometric authentication for the candidate in a case where it is determined that the biometric authentication has been performed for the candidate.

(Supplementary Note 20)

The storage medium according to supplementary note 18 or 19, the storage medium storing a program for causing a computer to further execute:

control processing of controlling the second capture device to capture the authentication part of the candidate in the case where it is determined that the biometric authentication has not been performed for the candidate.

(Supplementary Note 21)

The storage medium according to any one of supplementary notes 18 to 20, the storage medium storing a program for causing a computer to further execute:

generation processing of generating an output image representing the capture range of the first capture device on which a mark is superimposed, the mark indicating the object being tracked and whether biometric authentication has been performed for the object being tracked; and output processing of outputting the generated output image.

(Supplementary Note 22)

The storage medium according to supplementary note 21, in which the generation processing includes generating the output image by superimposing the mark on the video captured by the first capture device.

(Supplementary Note 23)

The storage medium according to supplementary note 21 or 22, in which the generation processing includes superimposing the mark to which information of the object is added on the output image as the mark indicating that the object for which biometric authentication has been performed.

(Supplementary Note 24)

A storage medium storing a program for causing a computer to execute:

tracking processing of tracking an object included in a video captured by a first capture device;

authentication processing of performing biometric authentication for a candidate among the objects being tracked based on a video of an authentication part of the candidate captured by a second capture device having a capture range in a part of a capture range of the first capture device;

generation processing of generating an output image representing the capture range of the first capture device on which a mark is superimposed, the mark indicating the object being tracked and whether biometric authentication has been performed for the object being tracked, based on a record of the biometric authentication performed for the object being tracked; and output processing of outputting the generated output image.

(Supplementary Note 25)

The storage medium according to any one of supplementary notes 18 to 24, in which the authentication part is an iris, and the biometric authentication is iris authentication.

While the disclosure has been described with reference to the example embodiments, the disclosure is not limited to these example embodiments. It will be understood by those of ordinary skill in the art that various changes in form and details may be made therein without departing from the spirit and scope of the disclosure as defined by the claims.

| Reference signs List | |
|---|---|
| 10 | authentication system |
| 11 | authentication system |
| 12 | authentication system |
| 100 | authentication device |
| 101 | acquisition unit |
| 102 | tracking unit |
| 103 | storage unit |
| 104 | detection unit |
| 105 | determination unit |
| 106 | authentication unit |
| 107 | generation unit |
| 108 | output unit |
| 109 | control unit |
| 200 | wide-area camera |
| 300 | authentication camera |
| 400 | display device |
| 1000 | computer |
| 1001 | processor |
| 1002 | memory |
| 1003 | storage device |
| 1004 | I/O interface |
| 1005 | storage medium |

The invention claimed is:

1. An authentication system comprising:
at least one memory storing a set of instructions; and
at least one processor configured to execute the set of instructions to:
track an object based on a captured result of a first capture device;
detect a candidate for iris authentication processing in the object being tracked;
perform determination of whether the iris authentication processing has been performed for the candidate based on a record of the iris authentication processing performed for the object being tracked;
generate, based on a captured result of the first capture device and a result of the determination, an output image on which a mark is superimposed, the output image representing a first capture range of the first capture device, the mark indicating the object being tracked and whether the iris authentication processing has been performed for the object being tracked; and
output the generated output image.

2. The authentication system according to claim 1, wherein
the at least one processor is further configured to execute the set of instructions to:
detect, based on the result of the determination, a target object having an iris detected based on the result of the determination, the target object capable of being captured by a second capture device having a second capture range that is part of the first capture range of the first capture device; and
perform the iris authentication processing based on an iris image captured by the second capture device when detecting the target object having the iris and that is capable of being captured and determining that the iris authentication processing has not been performed for the candidate.

3. The authentication system according to claim 2, wherein
the at least one processor is further configured to execute the set of instructions to determine, based on a size of an iris of the object, whether the object is within a range in which the second capture device is capable of capturing the iris.

4. The authentication system according to claim 2, wherein
the second capture device is configured to:
detect, based on the captured result of the first capture device, a position of an iris of the object;
change the second capture range in such a way that the position of the iris is centered in an image captured by the second capture image; and
capture the iris of the object.

5. The authentication system according to claim 2, wherein
the at least one processor is further configured to execute the set of instructions to:
estimate a direction of a face or a sight of the object; and
control the second capture device to perform capturing when an angle between the estimated direction and an optical axis of the second capture device is equal to or smaller than a predetermined angle.

6. The authentication system according to claim 2, wherein
the at least one processor is further configured to execute the set of instructions to:
change the second capture range based on a position of an iris of the object; and
change a focal length of the second capture device based on a size of the iris of the object.

7. The authentication system according to claim 2, wherein
the at least one processor is further configured to execute the set of instructions to:
extract a first feature of the object being tracked from video captured by the first capture device;
extract a second feature of the candidate iris authentication processing from an image captured by the second capture device; and
detect the target object corresponding to the candidate for the iris authentication processing from the object being tracked based on the extracted first feature of the object being tracked and the extracted second feature of the candidate for the iris authentication processing.

8. An authentication method comprising:
tracking an object based on a captured result of a first capture device;
detecting a candidate for iris authentication processing in the object being tracked;
determining whether the iris authentication processing has been performed for the candidate based on a record of the iris authentication processing performed for the object being tracked;
generating, based on a captured result of the first capture device and a result of the determination, an output image on which a mark is superimposed, the output image representing a first capture range of the first capture device, the mark indicating the object being tracked and whether the iris authentication processing has been performed for the object being tracked; and outputting the generated output image.

9. A non-transitory computer-readable storage medium storing a program causing a computer to execute:

tracking processing of tracking an object based on a captured result of a first capture device;

detection processing of detecting a candidate for iris authentication processing in the object being tracked;

determination processing of determining whether the iris authentication processing has been performed for the candidate based on a record of the iris authentication processing performed for the object being tracked;

generation processing of generating, based on a captured result of the first capture device and a result of the determination, an output image on which a mark is superimposed, the output image representing a first capture range of the first capture device, the mark indicating the object being tracked and whether the iris authentication processing has been performed for the object being tracked; and output processing of outputting the generated output image.

* * * * *